(12) United States Patent
Smallcomb et al.

(10) Patent No.: US 9,160,602 B2
(45) Date of Patent: Oct. 13, 2015

(54) METHOD OF IMPROVING PERFORMANCE IN A HIERARCHICAL MODULATION SYSTEM

(75) Inventors: Joseph Smallcomb, Lake Worth, FL (US); Paul Krayeski, Wellington, FL (US)

(73) Assignee: Sirius XM Radio Inc., New York, NY (US)

( * ) Notice: Subject to any disclaimer, the term of this patent is extended or adjusted under 35 U.S.C. 154(b) by 88 days.

(21) Appl. No.: 13/575,112

(22) PCT Filed: Jan. 26, 2011

(86) PCT No.: PCT/US2011/000143
§ 371 (c)(1), (2), (4) Date: Sep. 14, 2012

(87) PCT Pub. No.: WO2011/094001
PCT Pub. Date: Aug. 4, 2011

(65) Prior Publication Data
US 2013/0039442 A1 Feb. 14, 2013

Related U.S. Application Data

(60) Provisional application No. 61/282,342, filed on Jan. 26, 2010.

(51) Int. Cl.
| | |
|---|---|
| *H04L 27/20* | (2006.01) |
| *H04L 27/34* | (2006.01) |
| *H04L 27/18* | (2006.01) |
| *H04L 27/26* | (2006.01) |
| *H04L 1/00* | (2006.01) |
| *H04L 25/02* | (2006.01) |

(52) U.S. Cl.
CPC ............ *H04L 27/3483* (2013.01); *H04L 1/007* (2013.01); *H04L 27/183* (2013.01); *H04L 27/2067* (2013.01); *H04L 27/2604* (2013.01); *H04L 27/2627* (2013.01); *H04L 27/2649* (2013.01); *H04L 27/3466* (2013.01); *H04L 27/3488* (2013.01); *H04L 1/005* (2013.01); *H04L 1/0042* (2013.01); *H04L 25/0224* (2013.01)

(58) Field of Classification Search
CPC .............. H04L 27/183; H04L 27/3488; H04L 27/3466; H04L 27/2604; H04L 1/0042; H04L 25/0224; H04L 27/2067; H04L 27/2627; H04L 27/2649; H04L 27/3483
See application file for complete search history.

(56) References Cited

U.S. PATENT DOCUMENTS

| | | | |
|---|---|---|---|
| 6,154,452 A | 11/2000 | Marko et al. | |
| 6,229,824 B1 | 5/2001 | Marko | |
| 6,272,328 B1 | 8/2001 | Nguyen et al. | |
| 6,347,216 B1 | 2/2002 | Marko et al. | |
| 6,493,546 B2 | 12/2002 | Patsiokas | |

(Continued)

*Primary Examiner* — Kenneth Lam
(74) *Attorney, Agent, or Firm* — Roylance, Abrams, Berdo & Goodman, LLP

(57) ABSTRACT

A method is provided for enhancing a legacy satellite digital radio audio service (SDARS) by overlaying a hierarchically modulated data stream on a base layer (legacy) data stream and improving the synchronization of the received signal in which an overlay layer frame is synchronized to a base layer frame. The base layer frame includes additional data that is used to synchronize the receivers to demodulate and decode the overlay layer and the base layer. The additional data is modulated using a technique that aids the receiver in synchronizing the received signal that is different from the overlay layer.

19 Claims, 13 Drawing Sheets

(56) References Cited

U.S. PATENT DOCUMENTS

| | | | |
|---|---|---|---|
| 6,510,317 B1 | 1/2003 | Marko et al. | |
| 6,526,107 B1 * | 2/2003 | Katoh et al. | 375/368 |
| 6,564,003 B2 | 5/2003 | Marko et al. | |
| 6,683,921 B1 * | 1/2004 | Shiraishi et al. | 375/331 |
| 6,686,880 B1 | 2/2004 | Marko et al. | |
| 6,724,827 B1 | 4/2004 | Patsiokas et al. | |
| 6,785,565 B2 | 8/2004 | Gventer | |
| 6,823,169 B2 | 11/2004 | Marko et al. | |
| 6,834,156 B1 | 12/2004 | Marko et al. | |
| 6,876,835 B1 | 4/2005 | Marko et al. | |
| 6,944,139 B1 | 9/2005 | Campanella | |
| 7,010,263 B1 | 3/2006 | Patsiokas | |
| 7,180,917 B1 | 2/2007 | Marko et al. | |
| 7,215,713 B2 | 5/2007 | Walker et al. | |
| 7,230,998 B2 | 6/2007 | Walker et al. | |
| 7,251,281 B2 | 7/2007 | Marko et al. | |
| 7,263,329 B2 | 8/2007 | Acker | |
| 7,280,613 B2 | 10/2007 | Walker et al. | |
| 7,454,166 B2 | 11/2008 | Patsiokas | |
| 7,778,335 B2 | 8/2010 | Smallcomb et al. | |
| 7,809,326 B2 | 10/2010 | Patsiokas et al. | |
| 7,822,381 B2 | 10/2010 | Mantel et al. | |
| 2004/0071221 A1 * | 4/2004 | Nakada et al. | 375/260 |
| 2004/0101046 A1 * | 5/2004 | Yang et al. | 375/240.08 |
| 2005/0089068 A1 * | 4/2005 | Sun et al. | 370/509 |
| 2005/0111580 A1 * | 5/2005 | Walker et al. | 375/308 |
| 2005/0113040 A1 * | 5/2005 | Walker et al. | 455/102 |
| 2006/0239365 A1 * | 10/2006 | Smallcomb et al. | 375/260 |
| 2007/0104294 A1 | 5/2007 | Kim et al. | |
| 2008/0159186 A1 * | 7/2008 | Steer | 370/297 |
| 2008/0200114 A1 * | 8/2008 | Eberlein et al. | 455/3.02 |
| 2009/0097592 A1 | 4/2009 | Scarpa et al. | |
| 2009/0161777 A1 | 6/2009 | Scarpa et al. | |
| 2009/0168809 A1 * | 7/2009 | Scarpa et al. | 370/503 |
| 2009/0285155 A1 * | 11/2009 | Scarpa et al. | 370/326 |
| 2010/0008289 A1 | 1/2010 | Scarpa | |

* cited by examiner

METHOD OF IMPROVING PERFORMANCE IN A HIERARCHICAL MODULATION SYSTEM

RELATED PATENT APPLICATIONS

This application claims the benefit of U.S. Provisional Application Ser. No. 61/282,342 filed on Jan. 26, 2010, which is hereby incorporated by reference herein in its entirety.

FIELD OF THE INVENTION

The present application relates to a system and method for providing improved synchronization of a received signal in a hierarchical modulation system, particularly a hierarchical modulation system in which the overlay data stream is synchronized with the base layer data stream of a legacy waveform such that reliable synchronization of the legacy waveform enables the reliable decoding of the overlay data.

BACKGROUND OF THE INVENTION

Satellite radio operators are presently providing digital radio broadcast services covering the entire continental United States and other parts of North America. These services offer approximately 170 channels, of which nearly 75 channels in a typical configuration provide music and the remaining channels offer news, sports, talk and data services. A block diagram of an illustrative satellite digital audio radio service (SDARS) system 10 is depicted in FIG. 1. The illustrative SDARS system is a diversity system in which time, spatial and or code diversity is employed to overcome signal losses. For example, SDARS receivers demodulate and decode broadcast streams from multiple transmission sources such as first and second satellite streams broadcast from first and second satellites for time and spatial diversity purposes and/or terrestrial broadcast streams (e.g., from such terrestrial transmission sources as terrestrial repeaters, paging systems and/or cellular systems) employed to overcome LOS issues and other signal loss issues described below. For example, an SDARS system operated by Sirius XM Radio Inc. includes satellite uplink stations 2a, 2b for transmitting X-band uplinks to two satellites 4, 6 which provide frequency translation to the S-band for retransmission to radio receivers 3 within a coverage area. Radio frequency carriers from one of the satellites 4, 6 are also received by terrestrial repeaters 5. The content received at the terrestrial repeaters 5 is retransmitted at a different S-band carrier to the same receivers 3 that are within their respective coverage areas. These terrestrial repeaters 5 facilitate reliable reception in geographic areas where line of sight (LOS) reception from the satellites 4, 6 is obscured by tall buildings, hills, tunnels and other obstructions. The signals transmitted by the satellites 4, 6 and the repeaters 5 are received by SDARS receivers 3 which can be located in automobiles, in a handheld unit or in stationary units for home or office use. The SDARS receivers 3 are designed to receive one or both of the satellite signals and the signals from the terrestrial repeaters, and combine selected signals or select one of the signals as the receiver output. Thus, the receivers 3 can demodulate, decode and output a selected channel from the received signals even when, for example, a signal dropout has occurred in one of the transmission channels.

In a legacy SDARS system implemented by Sirius XM Radio Inc. described above, the plurality of base layer services can be modulated using a Quadrature Phase Shift Key (QPSK) modulation technique. As shown in FIG. 2, four constellation points are possible based on the combinations of the two symbols to be transmitted. These points are located at 45°, 135°, 225° and 315° as shown as (BL,X), where BL indicates the base layer symbol in the transmitted base layer QPSK constellation using 2 input BL bits.

The above base layer modulation technique can be enhanced to carry additional information by implementing a technique called hierarchical modulation. Hierarchical modulation can be applied to the QPSK transmission to modulate an additional symbol or symbols to the transmission by further modifying the base layer QPSK transmission. Hierarchical modulation enables the multiplexing and modulating of a plurality of data streams into a single data stream by overlaying the additional information onto a base layer. A need exists for realizing additional data capacity by improving or enhancing hierarchical modulation techniques to provide unique opportunities to enhance legacy SDARS services or other legacy broadcast services of systems that transmit data using diversity streams. A need also exists for using improved (next generation) receiver designs such that additional services can be provided to users while existing legacy receivers can continue to receive the services broadcast on the base layer modulated data stream in the legacy system.

Some examples of hierarchical modulation schemes on a QPSK waveform, which can be employed in an illustrative embodiment of the present invention described below, are shown in FIGS. 2a and 2b. Constellation (a) illustrates a phase shift keying (PSK) modulation technique to overlay the additional information onto a base layer. In this technique, the received vector is mapped as (BL, OL). The OL bit indicates an overlay symbol when the base layer modulation vector is rotated or phase offset by a predetermined angle $+/-d\phi$ toward either the Q-axis or the I-axis. As shown, for example, if the base layer modulation vector is rotated toward the Q-axis, the OL bit is represented by a 1, and if the base layer modulation vector is rotated toward the I-axis, the OL bit is represented by a 0. Where the OL bit is designated with an 'x', there is no rotation performed and therefore there is no overlay modulation. As shown in this example, for every two base layer bits transmitted, an additional bit can be overlaid onto the base layer.

Legacy receivers in the SDARS system, however, expect to receive a QPSK signal, thus the hierarchically modulated phase offset appears as an unnatural noise enhancement. In other words, the addition of a phase offset in the QPSK modulation appears as a phase error with respect to the base layer QPSK modulation. Transmission of the hierarchically modulated data on a noisy channel with a low signal-to-noise ratio may prohibit the detection of the base layer QPSK signal, much less the desired phase offset of the overlay layer modulation. Under certain conditions, the phase offset error can inhibit performance and synchronization of the received signal by impairing carrier recovery and tracking loops used to acquire and maintain receiver synchronization with the broadcast signal.

The terrestrial signals in an SDARS system are typically modulated utilizing a multi-carrier modulation technique such as Coded Orthogonal Frequency Division Multiplexing (COFDM). In legacy systems, this consists of multiple carriers, each modulated utilizing QPSK modulation. In accordance with an illustrative embodiment of the present invention described below, the hierarchical modulation of the overlay stream can be applied to the legacy signal via an APSK technique as shown in constellation (b), where the hierarchical modulation is added to the base layer modulation via amplitude modulation. In this method, the overlay bit is determined at a receiver by comparing the amplitude of the received vector with a reference amplitude. As shown, if the transmitted vector is produced with reduced amplitude scaling, the OL bit is designated as a 1, and if the transmitted vector is produced with increased amplitude scaling, the OL bit is designated as a 0. If there is no determined amplitude scaling with respect to the reference amplitude, there is no additional information overlaid onto the base layer.

Due to channel imperfections in a mobile environment, the amplitude of the signal of the receiver is affected by multi-path effects that result in amplitude variations, which differ across the COFDM sub-carriers and also differ in time as the receiver moves through the environment. As a result of the multi-path effects, the ability to discern amplitude modulation is greatly reduced and therefore it is very difficult to estimate the channel conditions and synchronize the received signals.

Accordingly, there is also a need for a method of improving the synchronization of a received hierarchically modulated signal, especially when legacy decoder synchronization is relied on for the retrieval of the overlay data as well; otherwise, the performance of both the legacy services, and the additional services achieved via hierarchical modulation, suffers.

SUMMARY OF EMBODIMENTS OF THE INVENTION

Illustrative embodiments of the present invention address at least the above problems and/or disadvantages and provide at least the advantages described below.

Accordingly, a first illustrative embodiment of the present invention provides a method of hierarchically modulating a transmission frame including an overlay layer modulated onto a base layer, in which the base layer provides a basic service and the overlay layer provides additional services. The overlay layer frame and the base layer are separately generated, and the overlay layer frame is synchronously aligned to the base layer frame. Additional data bits are added at the beginning of the aligned frame and at a selected interval throughout the aligned base layer frame, wherein the additional data bits are related to a synchronization bit or pattern. The additional bits are then modulated using a first modulation technique. Each other bit of the aligned base layer frame is then hierarchically modulated using a second modulation technique overlaid on the first modulation technique.

In a second illustrative embodiment, a method is provided for demodulating a hierarchically modulated transmission frame including an overlay layer modulated onto a base layer. A transmission frame is received and includes first data symbols modulated using a first modulation technique combined with second data symbols modulated using a second modulation technique. The first data symbol of the received transmission frame is demodulated using a first demodulation technique corresponding to the first modulation technique. The received frame is then synchronized according to the demodulated first received symbol. The second data symbol of the received transmission frame is then demodulated using a second hierarchical demodulation technique corresponding to the second modulation technique.

According to another illustrative embodiment, a second method is provided for hierarchically modulating a transmission frame including an overlay layer modulated onto a base layer. The overlay layer frame and the base layer are separately generated and the overlay layer frame is synchronously aligned to the base layer frame. Additional data bits are inserted at the beginning of the aligned frame, wherein the additional data bits are related to a synchronization bit or pattern. The aligned base layer frame and the additional bits are then split into a first multi-carrier modulation symbol and a plurality of second multi-carrier modulation symbols, wherein the first symbol comprises the additional data bits. A plurality of subcarriers in each of the second multi-carrier modulation symbols are designated as pilot carriers. The first multi-carrier modulation symbol and the plurality of pilot carriers are modulated using a first modulation technique, and the remaining subcarriers for each of the second multi-carrier modulation symbols are modulated using a second modulation technique overlaid on the first modulation technique to modulate the overlay layer onto the base layer.

In yet another illustrative embodiment, a method is provided for demodulating a hierarchically modulated transmission frame including an overlay layer modulated onto a base layer. A transmission frame is received including a first multi-carrier modulation symbol and a plurality of second multi-carrier modulation symbols. The first multi-carrier modulation symbol is demodulated using a first demodulation technique, wherein the first symbol is used to estimate the transmission channel. It is then determined for each of the plurality of second multi-carrier modulation symbols, which of the subcarriers are designated as pilot carriers. The pilot carriers for each of the second multi-carrier modulation symbols are demodulated using the first demodulation technique. The remaining subcarriers for each of the second multi-carrier modulation symbols are demodulated using a second demodulation technique to extract the overlay layer from the base layer.

Objects, advantages and salient features of the invention will become apparent to those skilled in the art from the following detailed description, which, taken in conjunction with annexed drawings, discloses illustrative embodiments of the invention.

BRIEF DESCRIPTION OF THE DRAWINGS

The above and other illustrative features and advantages of certain illustrative embodiments of the present invention will become more apparent from the following description of certain illustrative embodiments thereof when taken in conjunction with the accompanying drawings in which.

Throughout the drawings, like reference numerals will be understood to refer to like elements, features and structures.

DETAILED DESCRIPTION OF ILLUSTRATIVE EMBODIMENTS

The following description is provided to assist in a comprehensive understanding of illustrative embodiments of the invention of the present disclosure with reference to the accompanying figures. Accordingly, those of ordinary skill in the art will recognize that various changes and modifications of the illustrative embodiments described herein can be made without departing from the scope and spirit of the claimed invention. Also, descriptions of well-known functions and constructions are omitted for clarity and conciseness.

In accordance with an illustrative embodiment of the present invention, a Satellite Digital Audio Radio Service (SDARS) system 10 is enhanced with a hierarchically modulated data stream (hereinafter referred to as "an overlay data stream") that is overlaid on a base layer (legacy) data stream. It is to be understood, however, that the illustrative embodiment of the present invention can be implemented in other types of diversity systems (e.g., a system that employs plural transmission streams from one or more of cellular, paging, microwave or other modes of wireless broadcast communication for diversity purposes or other purposes). The addition of hierarchical modulation to an SDARS system significantly increases the amount of data and services transmitted via the SDARS system. Using improved (next generation) receiver designs, additional services can be provided to users while existing legacy receivers can continue to receive the services broadcast on the base layer modulated data stream in the legacy system.

Figure 1:
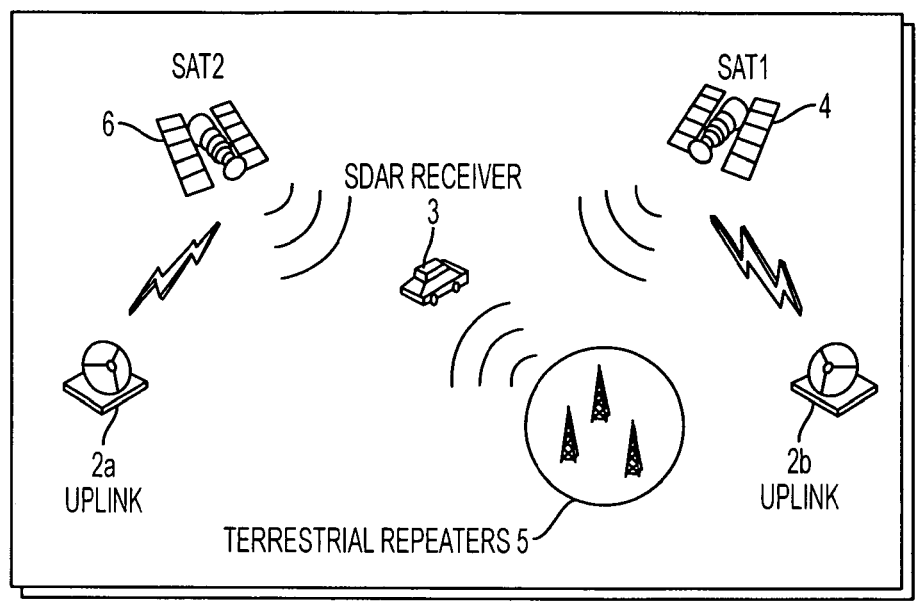
FIG. 1 illustrates a satellite digital audio radio system according to an illustrative embodiment of the present invention.

An illustrative Sirius XM Radio Inc. hierarchical modulation system (XMH) uses substantially the same general infrastructure as the XM SDARS system shown in FIG. 1 as described in the background. The uplink transmitter(s) 2a, 2b, SAT1 4, SAT2 6, terrestrial repeaters 5 and receivers 3, however, are modified to include additional capability and functionality to receive, transmit, modulate and demodulate, respectively, the hierarchically modulated stream that is overlaid on the base layer stream of the legacy system. See, for example, U.S. Pat. Nos. 7,778,335, 6,154,452, 6,229,824, 6,510,317, and 6,724,827, which are incorporated by reference herein in their entirety.

Referring back to FIG. 1, the uplink stations 2a and 2b in an illustrative XMH system provide both a base layer (legacy) data stream, and an overlay (hierarchically modulated) data stream as a combined data stream. In an illustrative embodiment, the overlay stream and the base layer stream are synchronized together, as further discussed below. The overlay data stream is preferably added to the base layer stream in a backward compatible way, so that legacy receivers can still receive the base layer stream. As in the legacy system, the uplink stations 2a, 2b provide the combined, hierarchically modulated data stream to at least one of the satellites SAT1 4 and SAT2 6 via an RF transmission link. Satellites 4 and 6 retransmit the combined data stream to a plurality of subscribers for reception via either fixed or mobile SDARS receivers 3. An illustrative frequency plan of the XMH system is the same as that described in commonly assigned U.S. Pat. Nos. 6,510,317 and 6,724,827, which are incorporated by reference herein in their entireties. As described in U.S. Pat. No. 6,154,452, which is incorporated by reference herein in its entirety, a receiver 3 comprises receiver arms for each of the satellite and terrestrial signals it receives. The receiver arms are configured to synchronize the frames of the received signals during demodulation and decoding to allow for diversity combining of the signals as needed.

In an illustrative embodiment, the terrestrial repeaters 5 receive the radio frequency carrier from at least one of the satellites SAT1 4 or SAT2 6. The content received at the repeaters 5 is retransmitted at a different S-band carrier to the subscribers that are within their respective coverage areas via a transmit antenna. The repeaters 5 are configured to demodulate the hierarchically modulated data to extract the overlay layer from the combined data stream and re-modulate the stream using a terrestrial modulation scheme such as multi-carrier modulation. The SDARS receivers 3 are designed to receive one or more of the satellite signals and the signals from the terrestrial repeaters and combine or select one of the signals as the receiver output. In addition, the combination of the three signals from the two satellite signals and the terrestrial signals can be diversity combined to improve reception performance. See, for example, U.S. Pat. Nos. 6,154,452, 6,229,824, and 6,823,169, which are incorporated by reference herein in their entireties.

Figure 3A:
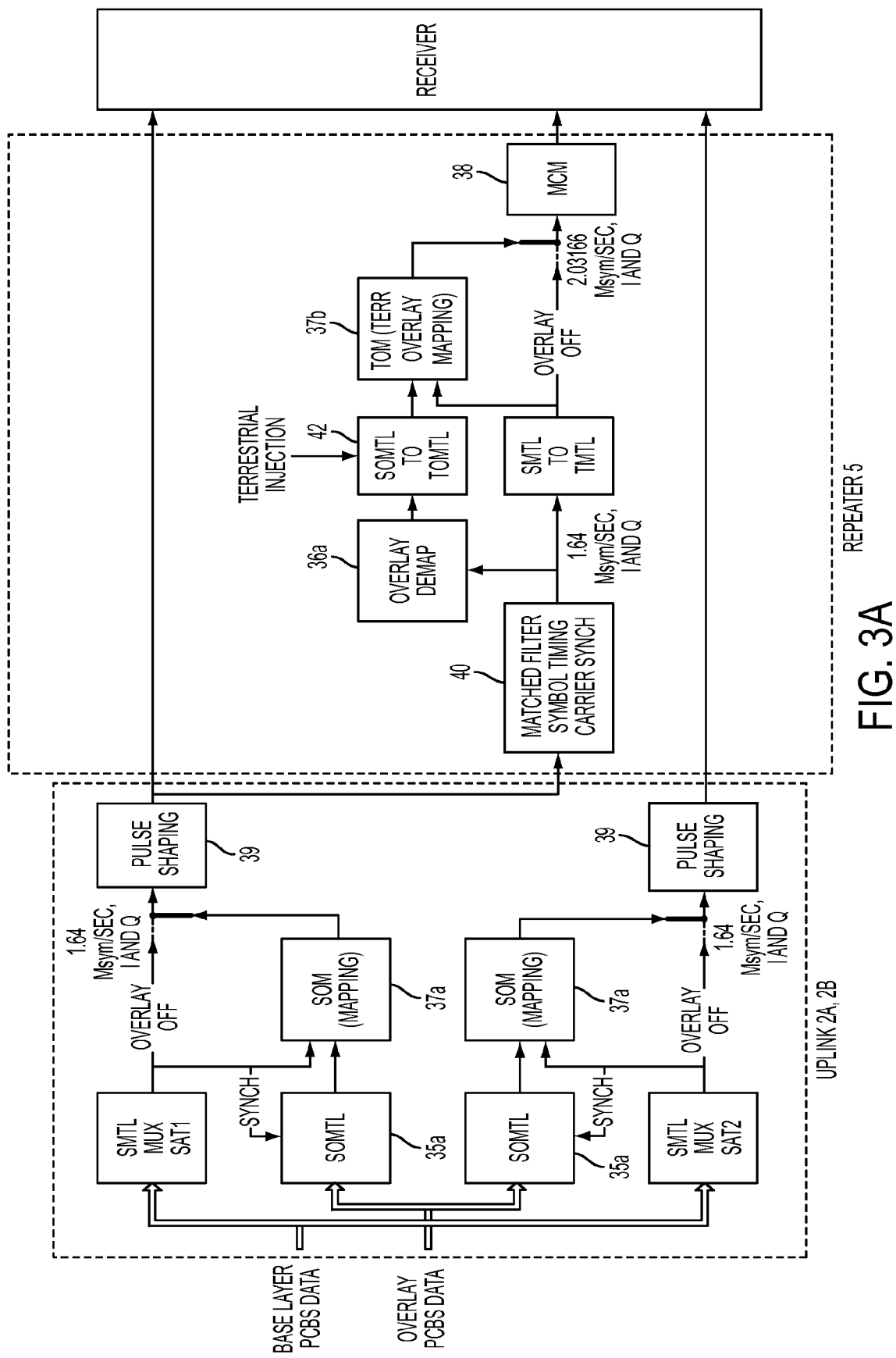
FIG. 3a illustrates a system architecture of a hierarchical modulation system according to an illustrative embodiment of the present invention.

FIG. 3a illustrates a system architecture of an exemplary XMH system. For illustrative purposes, the function blocks 35a, 37a, 36a, 42 and 37b in FIG. 3a are specific to the overlay system at an uplink station 2a, 2b, and at a terrestrial repeater 5, and the remaining function blocks are specific to the base layer system. With regard to the base layer system, the XMH comprises satellite multiplex transport layer (SMTL) multiplexers (MUX) and pulse shaping modules for each of the satellite signals at an uplink station. See, for example, U.S. Pat. No. 6,564,003, which is incorporated by reference herein in its entirety and describes a service layer and transport layer of an illustrative base layer. With regard to the overlay system, the XMH includes at least one satellite overlay multiplex transport layer (SOMTL) module 35a. Two SOMTL modules are shown, one for each of SAT1 and SAT2. The SOMTL modules 35a receive payload channel data from a plurality of service providers and adapt the payload channels to the transport layer as payload channel packets (PCPs) and payload channel fragments (PCFs). The SOMTL modules 35a also function to encode the payload channels and output a time-division multiplexed (TDM) bit-stream. Additional functionality of the SOMTL modules 35a is discussed further below with respect to FIG. 4. The illustrative XMH system also includes satellite overlay multiplex mapping (SOM) modules 37a for mapping the overlay data to the base layer data. The pulse shaping modules 39 modulate the combined data for transmission on the physical RF transmission link to SAT1 4 and SAT2 6. The SOMTL modules 35a and the SOM modules 37a can reside, for example, at an uplink station 2a, 2b along with the base layer modules. It is to be understood that the modules depicted in FIG. 3a can be implemented in hardware, software or a combination of both.

With continued reference to FIG. 3a and with regard to base layer processing, the terrestrial repeaters 5 can be provided with a matched filter/symbol timing and carrier synchronization module 40 and an SMTL to terrestrial multiplex transport layer (TMTL) module 42 for demodulating, synchronizing and re-formatting the received waveform from the satellite(s) into a terrestrial waveform that is, in turn, provided to a multiple carrier modulator (MCM) module 38. See, for example, U.S. Pat. Nos. 6,510,317 and 6,785,565, which are incorporated by reference herein, for an illustrative description of terrestrial repeater waveform processing and transmission. With regard to the overlay processing, each of the terrestrial repeaters 5 can also include an overlay decoding/demapping module 36a to undo the encoding and other processes performed by the SOMTL modules 35a, so that the decoded payload channel data can be re-encoded using parameters designated for the terrestrial data stream. This functionality is performed in the terrestrial overlay multiplex transport layer (TOMTL) module 35b. The TOMTL module 35b is also capable of injecting additional content into the payload channel data for transmission to the plurality of SDARS receivers 5. The additional content may include any additional information. For example, the additional content can be specific to a localized area (e.g., local news, weather forecasts, advertisements and the like). The terrestrial overlay multiplex layer (TOM) block 37b is provided to map the overlay data to the base layer data. The multi-carrier modulation module 38 then modulates the terrestrial data onto the physical RF transmission link.

Figure 3B:
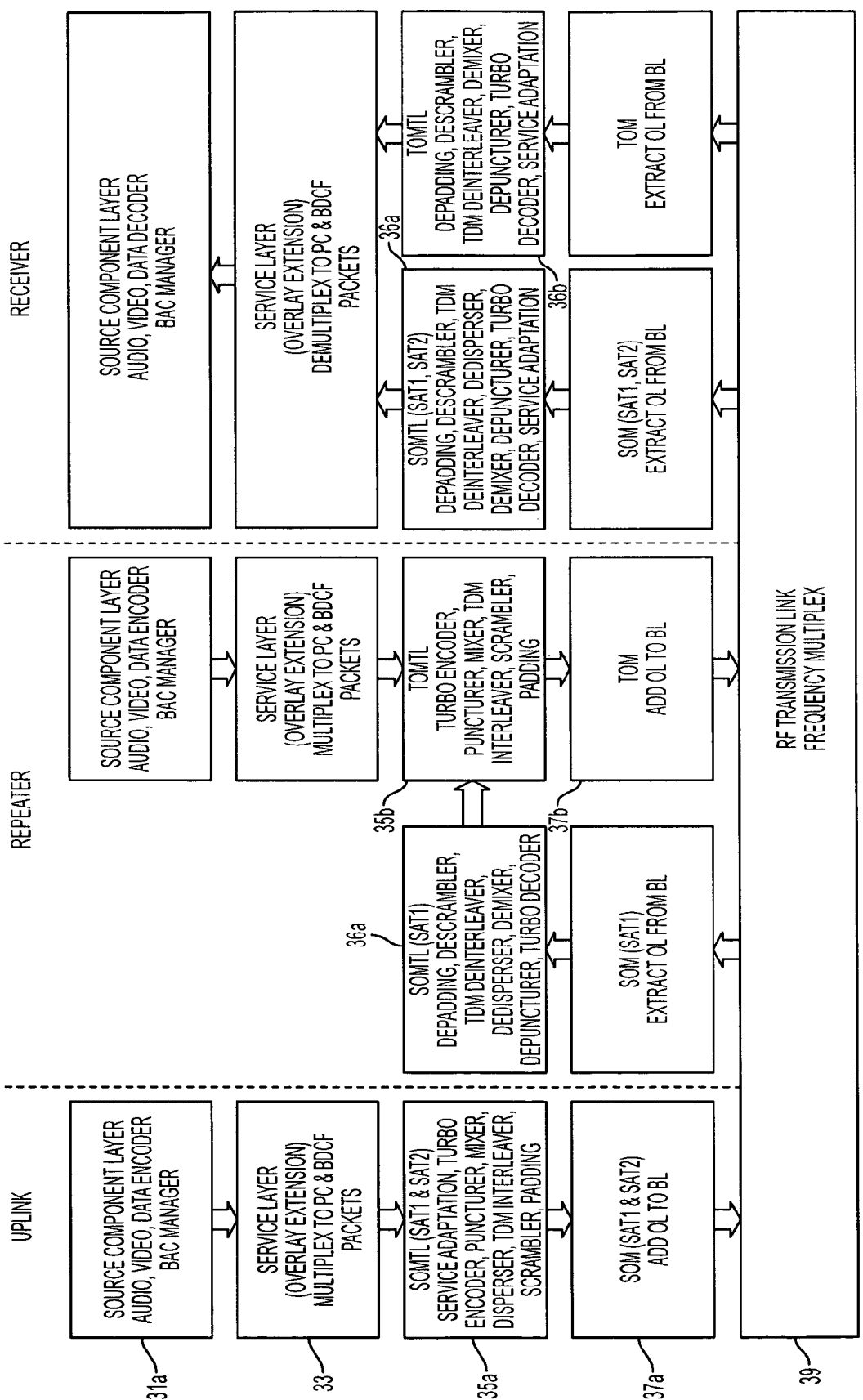
FIG. 3b is a block diagram of the layer structure of a hierarchical modulation system according to an illustrative embodiment of the present invention.

FIG. 3b illustrates a layer structure of a hierarchical modulation system (XMH) according to an illustrative embodiment shown in FIG. 3a. As discussed above, an illustrative overlay waveform provided at the uplink station 2a, 2b consists of a source component layer 31a, a service layer 33, a satellite overlay multiplex transport layer (SOMTL) 35a, and a satellite overlay multiplex physical layer (SOM) 37a, and the physical RF transmission link 39.

Like the legacy XM SDARS system, the source component layer comprises bit-streams containing audio, video, data or other information from a plurality of service providers. The basic input and output of the overlay system is a Payload Channel (PC). A PC is a transport mechanism used to carry one or more service components carrying the audio, video, speech, and certain types of associated data. The service layer 33 defines the contents of the PC including the types of service components contained in the PCs. A PC comprises a multiplex of up to 16 service components contained within several payload channel packets, preferably of 446 bytes each. The structure of the payload channel is the same as that used in the legacy XM system, the scope of which is beyond the present disclosure. See, for example, U.S. Pat. Nos. 7,809, 326, 7,180,917, 6,347,216, 6,876,835, and 6,686,880, which are incorporated by reference herein in their entireties. The service layer provides the PCs to the transport layer, as well as a unique 8 bit payload channel identifier (PCID) for each of the PCs provided to the SOMTL module 35a.

The transport layer in an illustrative embodiment generally serves to define any Forward Error Correction (FEC) encoding, an interleaving structure and a multiplexing structure of a transport ensemble containing up to 256 PCs. The output of the transport layer is a time-division multiplexed (TDM) bit-stream. The illustrative XMH system comprises enhanced SOMTL 35a and TOMTL 35b processing modules for preparing the overlay data to be mapped to base layer data.

Figure 4:
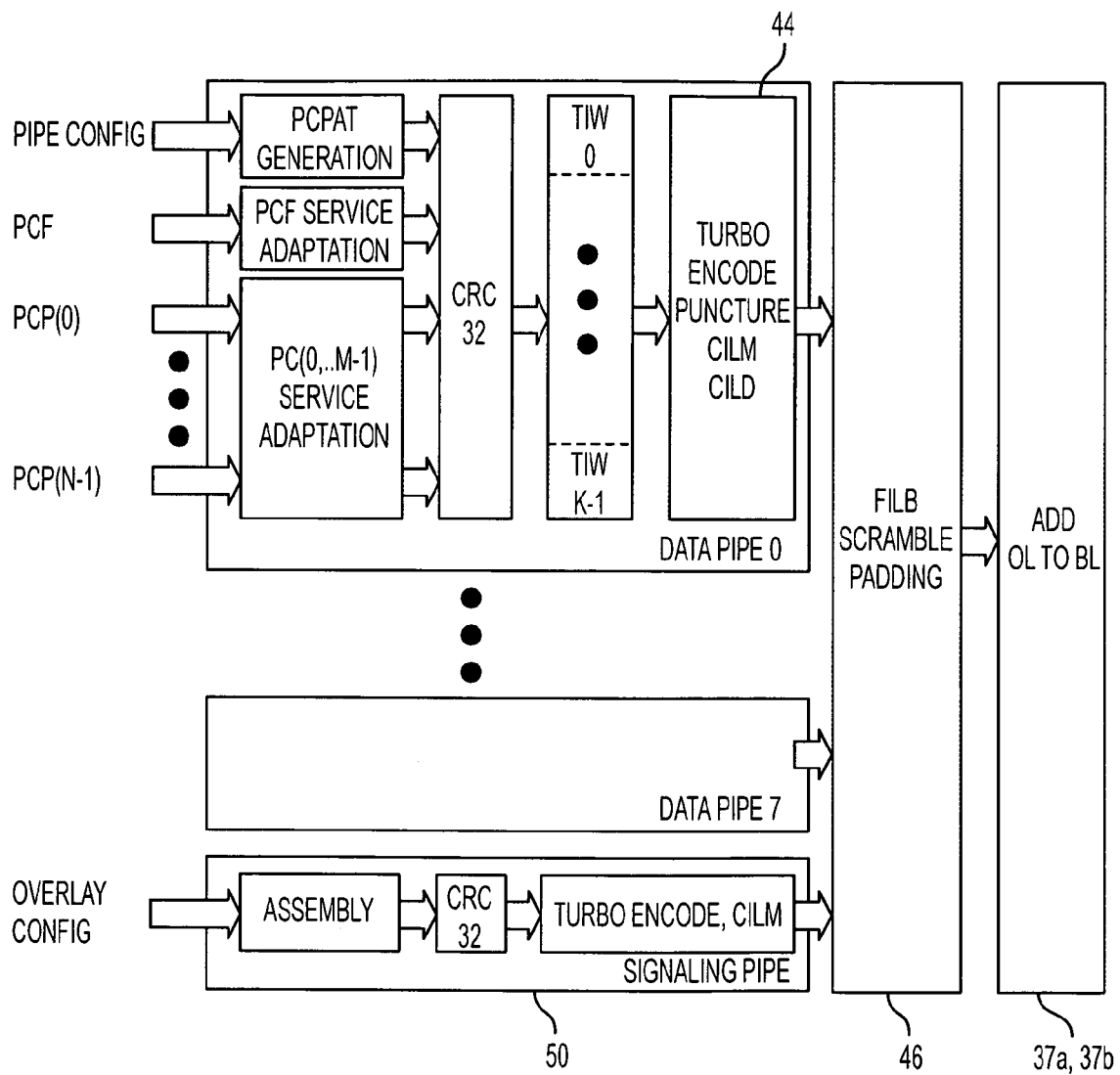
FIG. 4 illustrates a pipe configuration and multiplexing structure of an overlay layer according to an illustrative embodiment of the present invention.

FIG. 4 illustrates an illustrative multiplexing structure of the overlay system performed in the SOMTL modules 35a and the TOMTL modules 35b. The overall functionality of the SOMTL and the TOMTL modules are nearly identical and generate similar waveforms as discussed further below. The TOMTL waveform, however, provides additional capacity that is not required for retransmitting the content of the satellite signal. In an illustrative embodiment, this additional capacity amounts to 128 IUs, which may be used to inject additional terrestrial content.

The service layer data received from a service provider at an uplink facility or data received for terrestrial injection are first adapted to payload channel packets (PCPs) and payload channel fragments (PCFs). The PCFs are payload channels that include broadcast data channel fragment (BDCF) or prime rate channel fragment (PRCF) data fields without service content. The overlay content is mapped to up to 8 different pipes; as shown. A data pipe in the illustrative embodiment is a unique subset of a master frame transmitted in an XMH system. Each data pipe has a unique configuration that corresponds to respective data streams having defined reception characteristics within a common broadcast stream. A data pipe is defined by a reserved size in number of Turbo Input Codewords (TIWs) less than the total number of TIWs per master frame of overlay data. Each pipe is able to carry several PCPs and a PCF as data. Each of the M different payload channels for each pipe consists of one or more payload channel packets, so there are N different payload channel packets at the input for each pipe configuration.

The signaling pipe is common for all streams and carries the data pipe multiplex structure of the transport layer for each stream (i.e. SAT1, SAT2, and terrestrial). The signaling pipe comprises a description of each of the data pipes and their configuration for each of the streams. Each pipe has its own transport layer configuration regarding the FEC and the channel interleaver. For example, the data rate, the code rate, and the interleaver parameter can be different for each of the pipes. The signaling pipe is used within a decoder at a receiver or repeater to decode the overlay stream from each of the received streams. The position, the size and all decoding parameters of the signaling pipe are generally constant and are not configurable, except during a reconfiguration as discussed in the commonly assigned application titled "Method of Automatic Reconfiguration in a Hierarchical Modulation System" filed on even date herewith (U.S. Patent Application Publication No. 2013/0201895), which is incorporated by reference herein in its entirety.

The incoming PCF and PCPs from the service layer are first adapted to the transport layer as discussed above. After service adaptation, the PCPs and PCF packets become transport payload channel fragment (TPCF) and transport payload channel packets (TPCPs). For the PCP, the bits that are not transported are removed. For example, for each PCP, the service adaptation function may drop a service preamble and part of an auxiliary data field, thus omitting up to 48 bits for each PCP. If the number of PCPs received from the service layer is less than the allotted number of PCPs to fill the pipe, empty TPCPs having all zero content may be inserted. For the PCF, padding bits are inserted to fill up the remaining space in each pipe. The number of PCPs per pipe and the size of the PCF are a function of K, the length of the pipe in number of turbo input words (TIWs), which are the basic input blocks for a turbo encoder.

A PCP allocation table (PCPAT) is added for each data pipe. For the PCF packet and each of the PCPs, the PCPAT field carries the information for mapping to the payload channels. The PCPAT table comprises payload channel identifiers (PCIDs) of the PCF and the PCPs in the order of their allocation, i.e. location within the data pipe. The PCPAT field preferably comprises an 8 bit PCID entry for the TPCF and every TPCP. The PCIDs are supplied by the service layer and are used to identify one of the 256 different payload channels input to the transport layer. Accordingly, the PCPAT is generated dynamically for each data pipe in the output TDM frame.

As shown in FIG. 4, in accordance with an illustrative embodiment, a 32 bit cyclic redundancy check (CRC) field is calculated and inserted in each data pipe and signaling pipe. There is preferably one CRC32 field for each PCP. For the PCPAT and the PCF, a common CRC32 field may be inserted. As shown, the basic unit of the transport layer is a turbo input word (TIW). Each data pipe is designated an integer number of TIWs per TDM frame. The turbo input words are sequentially filled with the PCPAT, the TPCF and the TPCPs together with the CRC32 field. The turbo input words are then input to a turbo encoder for forward error correction coding.

The turbo encoder, provided as part of encoding module 44, encodes the input TIWs based on a desired code rate designated for the individual data pipes. The turbo encoder preferably performs a desired puncturing pattern on the output turbo encoded symbols to achieve a desired coding rate designated for the individual pipes. The non-punctured symbols comprise a plurality of turbo output words (TOWs). The TOWs are preferably then processed by a channel interleaver mixer (CILM), also provided as part of encoding module 44, which may be a block interleaver processing each TOW output from the turbo encoder. The illustrative purpose of the CILM is to reorder the bits of the TOW such that adjacent bits are spread throughout the TOW. The parameters of the interleaver are configurable and are designated in the signaling pipe for each overlay pipe. Each pipe may use a different configuration to realize a desired trade-off between capacity and interleaver delay. A channel interleaver disperser (CILD) of the encoding module 44 is also preferably provided to chop the TOWs into interleaver units (IUs). The IUs may be dispersed over a long time span by interleaving with other IUs belonging to different TDM frames. The disperser is also configurable for each pipe.

The encoded output of each of the pipes 0 to 7 and the signaling pipe consists of an integer number of interleaver units (IUs). The signaling pipe comprises 7 IUs that are multiplexed with a plurality of data pipes within a master frame. The number of IUs for each pipe is dependent on the selected parameters and the bitrate selected for the pipe. If the used capacity of a data pipe is less than the allotted capacity, then empty IUs may be added to fill up the TDM frame. All IUs of the TDM frame are block interleaved in the frame interleaving block (FILB) 46. The FILB 46 first multiplexes the IUs to a considered stream (i.e. SAT1, SAT2, terrestrial) as indicated in the signaling pipe. The multiplexed pipes for each stream are then scrambled. The IUs are then written into a matrix row by row in ascending order of pipes. The bits are then mapped to ternary symbols (tsym) representing the overlay modulation bit. The size of the matrix is 114 rows times 32 columns for the SOMTL frame and 118 rows times 32 columns for the TOMTL frame. The IUs are read column by column to generate the respective SOMTL and TOMTL frames. The seven IUs of the signaling pipe are then multiplexed with the output of the FILB 46, each preferably separated by an equal distance within the frame. Any necessary padding bits are added to fill the TDM frame to match a TDM frame of the base layer.

Table 1 below summarizes the parameters of an illustrative TDM base layer satellite multiplex transport layer (SMTL) frame, on which an SOMTL frame is aligned.

TABLE 1

|  | Symbols | Bits |
|---|---|---|
| MFP | 64 | 128 |
| 205 FSP | 6560 | 13120 |
| Payload | 701760 | 1403520 |
| Padding | 96 | 192 |
| Total | 708480 | 1416960 |

Figure 5:
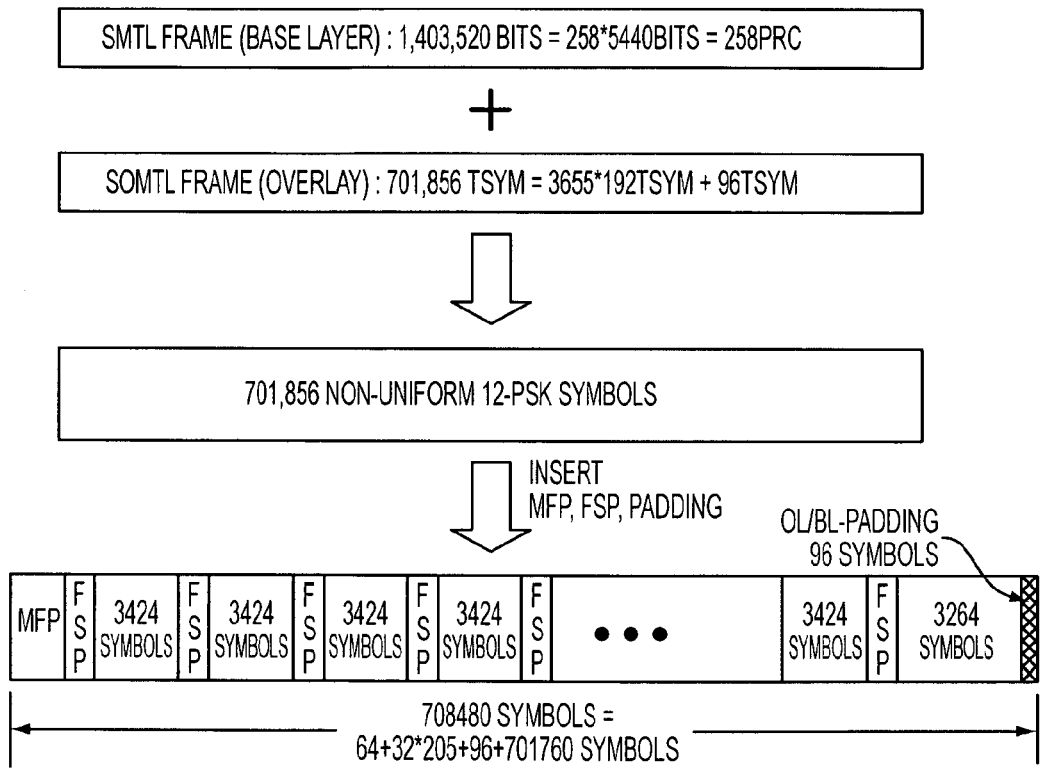
FIG. 5 illustrates the aligning of a satellite overlay multiplex transport layer (SOMTL) frame onto a satellite multiplex transport layer (SMTL) base layer frame according to an illustrative embodiment of the present invention.
Figure 6:
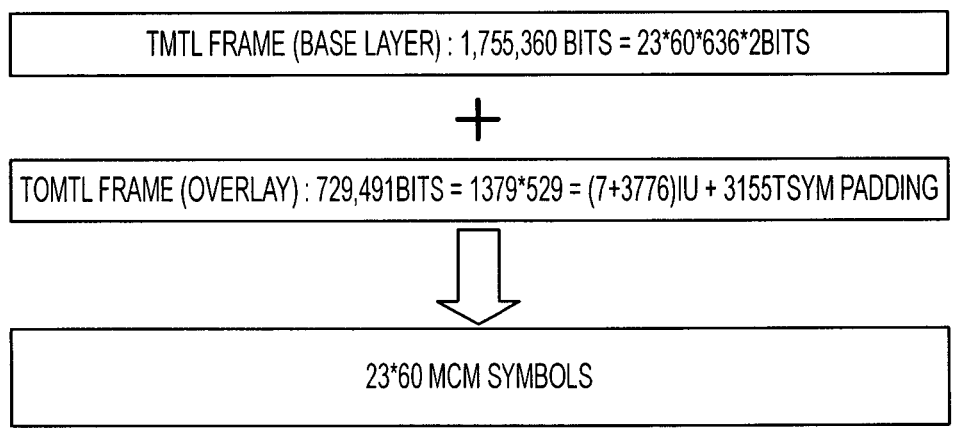
FIG. 6 illustrates the aligning of a terrestrial overlay multiplex transport layer (TOMTL) frame onto a terrestrial multiplex transport layer (TMTL) base layer frame according to an illustrative embodiment of the present invention.

FIG. 5 illustrates the aligning of an SOMTL frame output from the FILB block 46, as discussed above, to the base layer SMTL frame according to the above parameters (Steps 102, 104). The base layer SMTL frame of an illustrative embodiment comprises 258 prime rate channels (PRCs) of 5440 bits each, totaling 1,403,520 bits of payload. To match the payload size of the SMTL frame, the overlay SOMTL frame comprises 3655 IUs (114×32+7) of 192 tsym bits each, as discussed above, totaling 701,760 bits, which amounts to 1 bit per every 2 bits of the SMTL payload, which is suitable for the hierarchical modulation technique of the illustrative embodiment as discussed with respect to FIG. 2.

Once the SOMTL frame is aligned to the SMTL frame, as performed in the SOM mapping module 37a of FIG. 3a, a master frame is formed according to the illustrative embodiment shown in FIG. 5. A master frame of the base layer of a satellite transmission includes the aligned payloads of the base layer services (SMTL) and the overlay layer services (SOMTL) to which a 128 bit master frame preamble (MFP), 205 equally spaced 64 bit fast synchronization preambles (FSPs) and a 192 bit satellite padding field are added (Step 106). The MFP can provide synchronization to a decoder at the receiver or terrestrial repeater, and the FSPs can be used to support QPSK demodulator resynchronization after short dropouts of the satellite signal. The FSPs are preferably inserted every 6848 bits (3424 symbols) with the FSP being inserted directly after the last bit of the MFP. A TDM decoder at the receiver or terrestrial repeater making use of the FSPs will have a higher robustness against cycle slips or even bit-slips that may occur in the demodulated signal.

In a hierarchically modulated transmission frame, detection of the base layer data is typically more robust than the overlay data due to the higher power of the base layer data. The overlay data are generally transmitted at a lower power than the base layer data due to the smaller separation between overlay symbols relative to the legacy symbols. Accordingly, in the illustrative embodiment, the synchronization for the overlay data is derived from the base layer. The MFP and FSPs of the master frame do not carry any SOMTL data to aid in synchronization of the overlay stream. For this reason, it is important that the SMTL and SOMTL frames are synchronized. Consequently, synchronization of the base layer stream needs to be robust in order to reliably demodulate and decode the overlay stream as well as the base layer stream.

Figure 2A:
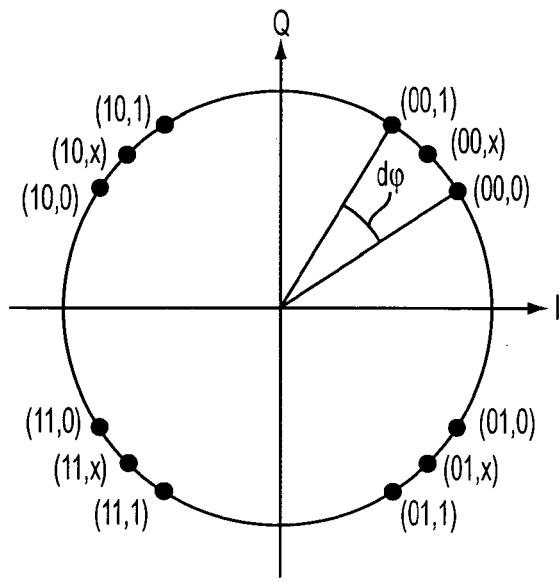
FIGS. 2a and 2b illustrate example constellations demonstrating the concepts of hierarchical modulation according to illustrative embodiments of the present invention.
Figure 2B:
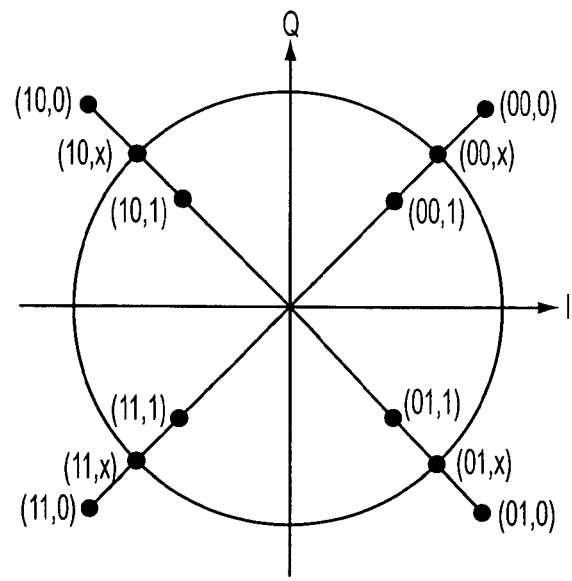

In the illustrative embodiment, the master frame bits are hierarchically modulated by applying a phase offset to a base layer QPSK modulated symbol, as discussed with respect to constellation (a) in FIG. 2. The addition of the phase offset, however, appears as a phase error with respect to the base layer QPSK and impacts the ability of the receiver to synchronize the received base layer signal. In the illustrative embodiment, the modulation index dφ is preferably in the range of 23 to 27 degrees with a baseline value of 25 degrees. As the offset of dφ increases, the energy in the overlay layer increases thus improving the performance and reception of the overlay layer. The impact of an increased phase offset, however, causes greater difficulty in demodulating and decoding the base layer resulting in unreliable performance of the receiver.

In accordance with an illustrative embodiment of the present invention, receiver performance can be improved by transmitting synchronization bits or patterns of the base layer using standard QPSK modulation, in other words, without hierarchically modulating these bits (Step 108). As shown with respect to FIG. 5, the overlay payload frame (SOMTL) is aligned with the base layer payload frame (SMTL). In the illustrative embodiment, only those base layer bits aligned with an overlay bit are hierarchically modulated (Step 110). Therefore, in the illustrative embodiment, none of the MFP or FSP bits are hierarchically modulated. Accordingly, the receiver can decode the MFP and FSP symbols in the received stream in confidence that any phase rotations are due to channel conditions and not any intentional phase offset due to hierarchical modulation, and therefore the signal acquisition processes and recovery tracking loops are performed more reliably (Steps 202, 204). As such, the legacy receivers can reliably demodulate the synchronization information used to synchronize the remaining payload bits of the base layer and the overlay layer in the received frame for reliable demodulation and decoding (Step 206). By relying solely on the base layer synchronization bits to synchronize the overlay layer bits, the overlay payload can be increased since none of the bits are reserved strictly for synchronization. Additionally, synchronization at the receiver is simplified since signal acquisition is based solely on the more reliably received base layer symbols (Step 208).

In another illustrative embodiment of the present invention, if the channel conditions are favorable, the synchronization bits of master frame can be hierarchically modulated with a greatly reduced dφ interspersed with hierarchically modulated data symbols of a greater dφ. By interspersing the variable phase offsets, the receiver can more reliably demodulate and decode the received synchronization bits while still providing acceptable performance of the overlay bits (Steps 204, 206). As discussed above, a larger phase offset of the hierarchically modulated bits increases the energy in the overlay signal, thus improving reception of the overlay bits but decreasing performance of the base layer reception. Accordingly, the MSP and the FSP bits which are relied on for synchronization of the received signal can be transmitted with a reduced offset thus increasing the robustness of the signal receiver in demodulating these bits. Such improvement in reception of the base layer synchronization information provides for greatly enhanced acquisition and tracking performance in the receiver for both the base layer and the overlay layer. The carrier recovery and tracking can be completely based on the transmitted synchronization patterns of the base layer in a feed forward architecture.

With respect to the retransmission and hierarchical modulation of a master frame at a terrestrial repeater, alignment of the overlay frame (TOMTL) to a base layer frame TMTL is similarly performed in the TOM mapping module 37*b* shown in FIG. 3*a* (Steps 302, 304). The structure of an illustrative terrestrial multiplex layer (TMTL) TDM bit-stream is similar to that of an SMTL TDM bit-stream. The master frame structure of a base layer TMTL frame, however, differs from that of the SMTL by a bit-field length, a padding length, and the fact that no FSPs are inserted for the terrestrial transmission. The FSPs are not required in the terrestrial transmission because certain effects like short dropouts and cycle slips will not occur with the multi-carrier modulation technique employed in the illustrative embodiment. A 128 bit MFP the same as the SMTL MFP is similarly inserted at the very beginning of the a TMTL master frame (Step 306), followed by a payload with a length of 1,754,440 bits and a padding field with a length of 832 bits, resulting in a frame length of 1,755,360 bits. For multi-carrier modulation (MCM), such as OFDM, the 1,755,360 bit frame is transmitted over 1380 MCM symbols using 636 subcarriers transmitting a QPSK modulation of 2 bits (Step 308).

In an illustrative embodiment, channel estimation at the receiver is performed using transmitted pilot symbols of a reference amplitude interspersed throughout hierarchically modulated carriers of a scaled amplitude as discussed above with respect to constellation (b) of FIG. 2. This technique is similar in theory to the above method of transmitting non-hierarchically modulated synchronization bits. The pilot symbols carry base layer data modulated using QPSK, but are not hierarchically modulated for similar reasons as discussed above with respect to the satellite transmission. The pilot signals are used for measurement of the channel conditions (i.e. the equalizer gain and phase shift for each sub-carrier) and may also be used for time synchronization (to avoid intersymbol interference) and frequency synchronization (to avoid inter-carrier interference).

A receiver is able to more accurately detect the transmitted pilot carriers at the reference amplitude and is therefore able to reliably estimate the transmission channel for synchronization of the received frame. Accordingly, the alignment of the TOMTL overlay frame onto the TMTL base layer frame takes special care to ensure proper alignment with respect to the pilot carriers. The parameters of an exemplary TOMTL frame in consideration of the pilot carriers used for channel estimation are summarized in Table 2 below.

TABLE 2

| | |
|---|---|
| MCM symbols per 432 ms frame | 1380 |
| MCM symbols with no overlay data | 1 |
| MCM symbols with overlay data | 1379 |
| Total number of carriers | 637 |
| Carriers used for pilot symbols | 108 |
| Available tsym per MCM symbol | 529 |
| Total available overlay data tsym | 729491 |
| IUs to transmit signaling pipe | 7 |
| tsym required for signaling pipe | 1344 |
| IUs for data content | 3776 |
| tsym for data content | 724992 |
| Padding tsym (scrambled zeros) | 3155 |
| Total number of tsym per TOMTL | 729491 |

As shown, there are 1380 MCM symbols per 432 ms frame. However, only 1379 of these symbols are used to transport information with overlay modulation. The first MCM symbol carries the MFP for the frame and similar to above does not carry any overlay information (Step 308). By not hierarchically modulating the MFP carrying symbol, reception of the MFP is improved at a receiver and thereby eases the synchronization for the remainder of the frame. Each MCM symbol is transmitted over 637 total carriers, but 108 of these are used as the non-hierarchically modulated pilot carriers. Accordingly, 529 of the carriers transmit a hierarchically modulated bit (tsym) resulting in 729,491 (1379×529) total bits (tsym) for the TOMTL frame. As discussed above, the FILB module 46 outputs 3776 IUs (118×32) which are multiplexed with 7 IUs of the signaling pipe. These 3783 IUs carry 192 tsym each for a total of 726,336 bits. Accordingly, there are an additional 3155 tsym bits added as padding to the TOMTL frame.

In accordance with an illustrative embodiment of the present invention, hierarchical modulation is performed as discussed above with respect to constellation (b) of FIG. 2. The overlay bits are hierarchically modulated onto the base layer QPSK symbol by scaling the amplitude of the QPSK symbol (Step 314). The amplitude is preferably scaled by a value between 0.2 and 0.4. In an illustrative embodiment, the amplitude is scaled by a value of 0.3. It is to be understood that the scaling value may be determined by the perceived channel conditions and may be adjusted accordingly. Similar to the phase offset problem discussed above, as the amplitude scaling is increased, the overlay layer signal is transmitted with greater energy and better performance of the overlay layer is realized. Such scaling, however, complicates the receiver's ability to accurately estimate the channel amplitude and thus diminishes the performance of the receiver.

In the illustrative embodiment, the TOMTL overlay symbols are mapped to the base layer QPSK symbols selected to carry overlay data. The amplitude of a mapped subcarrier is increased by a factor of 1.3 if the overlay data tsym is '0' and reduced by a factor of 1.3 if the overlay data tsym is '1'. For each of the pilot carriers, there is no hierarchical modulation, thus the amplitude is not changed (Step 312).

Figure 7:
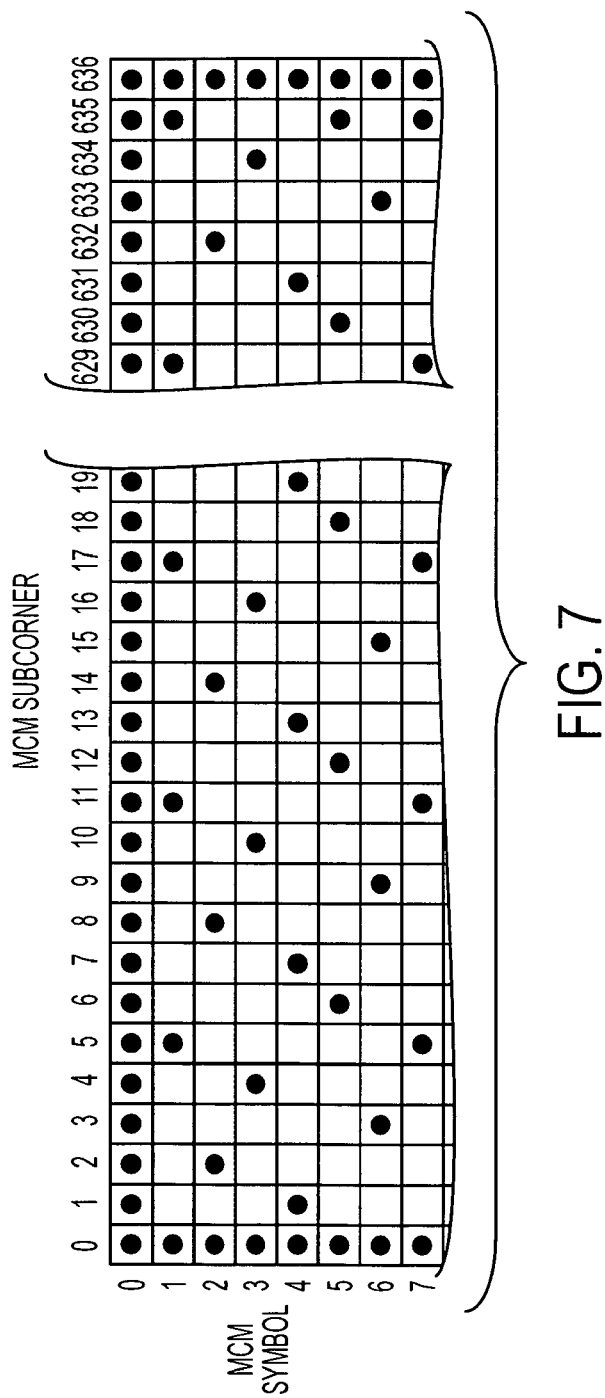
FIG. 7 illustrates a pilot subcarrier pattern structure for transmitting pilot carriers interspersed with the hierarchically modulated subcarriers for the terrestrial frame according to an illustrative embodiment of the present invention.

For the terrestrial signal, two types of pilot signals are distinguished. As discussed above, the first MCM symbol carrying the MFP of the master frame does not contain overlay data and is therefore used as a pilot to initialize channel estimation at a receiver (Step 402, 404). The next 1379 MCM symbols include fixed and scattered pilots throughout (Step 310). In the illustrative embodiment, a special pattern is used for the scattered pilots as shown in FIG. 7. For every MCM symbol, every $6^{th}$ subcarrier starting at a varying offset (relative to the first subcarrier), is used as a pilot and therefore carries no overlay modulation. For every MCM symbol in the frame excluding the first (i.e. i=1, . . . 1379), the offset can be calculated using a modulo 6 operation on each index (i−1) as represented in Table 3, below. Additionally, the subcarriers 1 and 636 are used as fixed pilots for all MCM symbols. For offset 0, there is an exception to the rule that every $6^{th}$ subcarrier carries a pilot, as this pattern has only 107 pilots due to the fixed pilots. Accordingly, an additional pilot is added at subcarrier 635 for each of these symbols. Accordingly, there are 529 overlay data symbols tsym for every MCM symbol except the first which carries the MFP bits.

TABLE 3

| mod(i − 1, 6) | Offset |
|---|---|
| 0 | 5 |
| 1 | 2 |
| 2 | 4 |
| 3 | 1 |
| 4 | 0 |
| 5 | 3 |

In accordance with an aspect of this illustrative embodiment of the present invention, an equally dispersed subset of the COFDM sub-carriers are transmitted as pilot carrier with a deterministic amplitude (e.g., halfway between the highest and lowest amplitude modulation of the hierarchically modulated symbols) to enable the receiver reliably to estimate the multiple transmission channels (Step 312). In an illustrative embodiment, the subset of COFDM subcarriers transmitted with the deterministic amplitude can also be varied over time (i.e. for each MCM symbol) in a deterministic fashion. In this manner, the channel estimate produced in the receiver can reliably be determined for each symbol and/or frequency or any combination thereof. Additionally, the subcarriers of the first MCM symbol are all transmitted with the deterministic amplitude to initialize the channel estimation and further enable the receiver to reliably demodulate and decode the remainder of the frame (Step 408). As discussed above, the pilot carriers carry base layer data, thus the deterministic amplitude is that used for modulation of the base layer data. The reliable channel estimate is then used in the demodulation process to improve the hierarchical demodulation (Step 410), as the overlay bits do not carry any synchronization information for the overlay layer.

While the above illustrative embodiments discuss specific hierarchical modulation techniques, other forms of hierarchical modulation are known, each providing some trade-off in the robustness of the received signal for both the base layer and the hierarchical/overlay layer in consideration of the transmission channel effects. It is understood that various other known methods of hierarchical modulation are also contemplated and are fully within the techniques of the illustrative embodiments.

Using the above technique, improved (next generation) receivers capable of demodulating the overlay data can provide the additional services embedded on the overlay layer to users while existing legacy receivers can continue to receive the services broadcast on the base layer modulated data stream in the legacy system. In accordance with the illustrative embodiments, performance of both the legacy receivers and the next generation receivers are improved. An illustrative configuration of such next generation receivers and additional techniques for use in the illustrative embodiments are shown and described, for example, in commonly assigned U.S. Patent Application Publication Nos. 2009/0168809, 2009/0097592 and 2010/0008289, which are incorporated by reference herein in their entireties.

Figure 8:
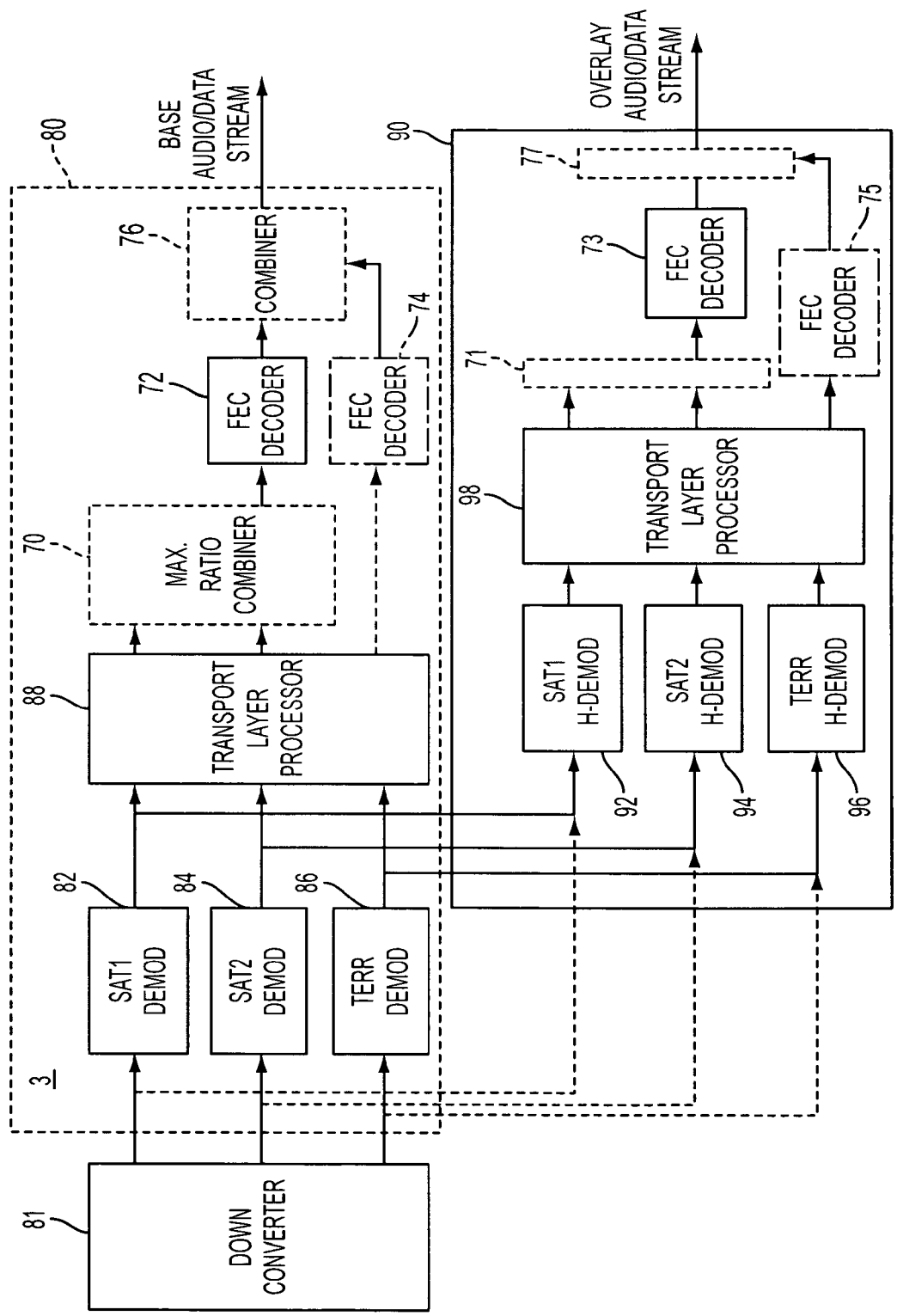
FIG. 8 depicts a block diagram of a receiver according to an illustrative embodiment of the present invention.
Figure 9:
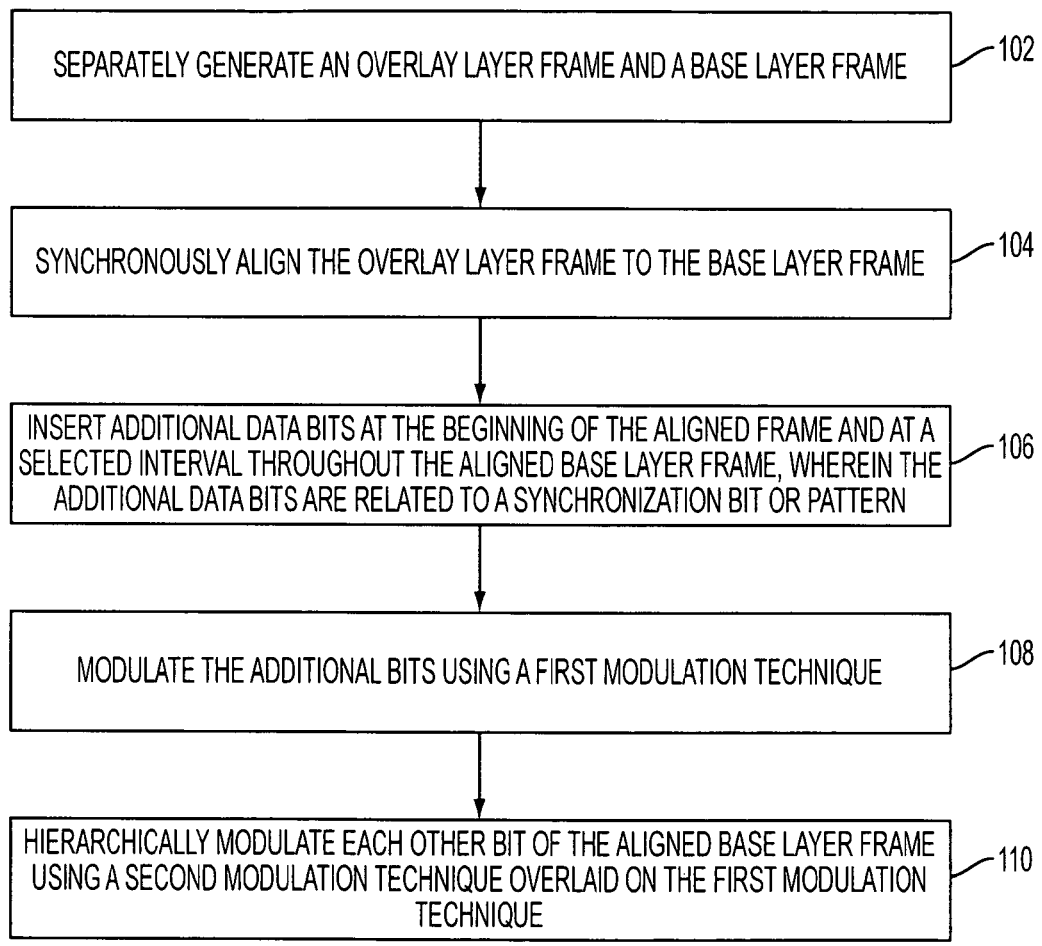
FIG. 9 is a flowchart illustrating a method for hierarchically modulating a transmission frame including an overlay layer modulated onto a base layer according to an illustrative embodiment of the present invention.
Figure 10:
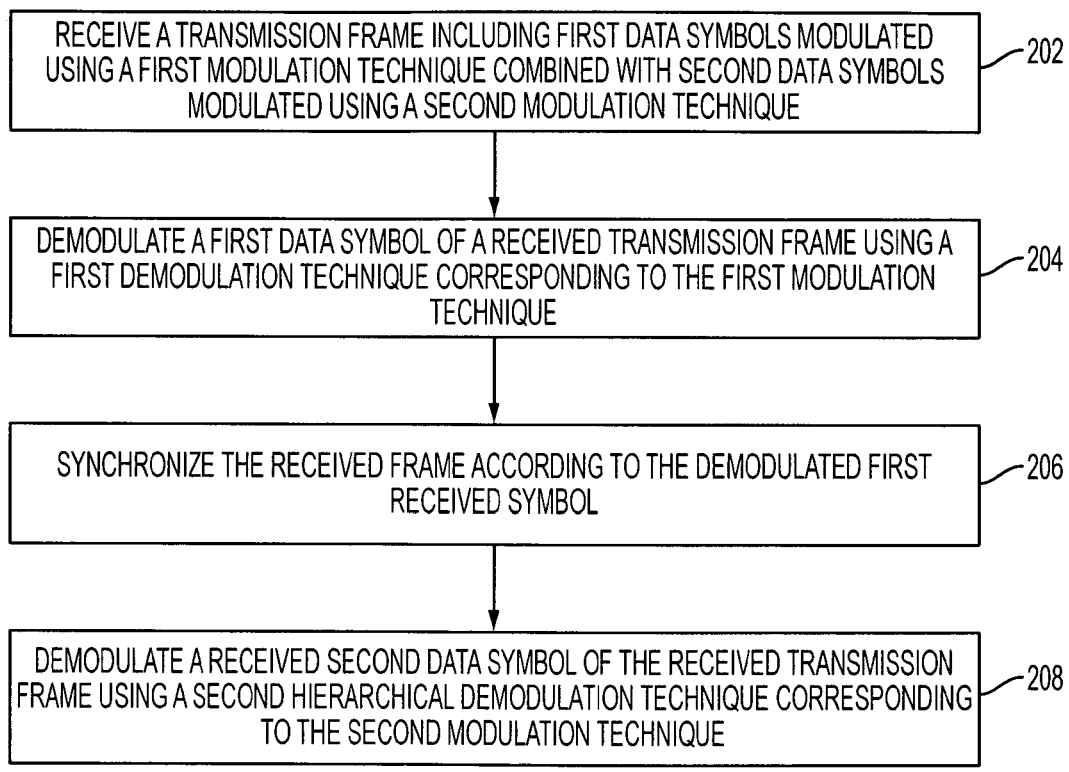
FIG. 10 is a flowchart illustrating a method for demodulating a hierarchically modulated transmission frame including an overlay layer modulated onto a base layer according to an illustrative embodiment of the present invention.
Figure 11:
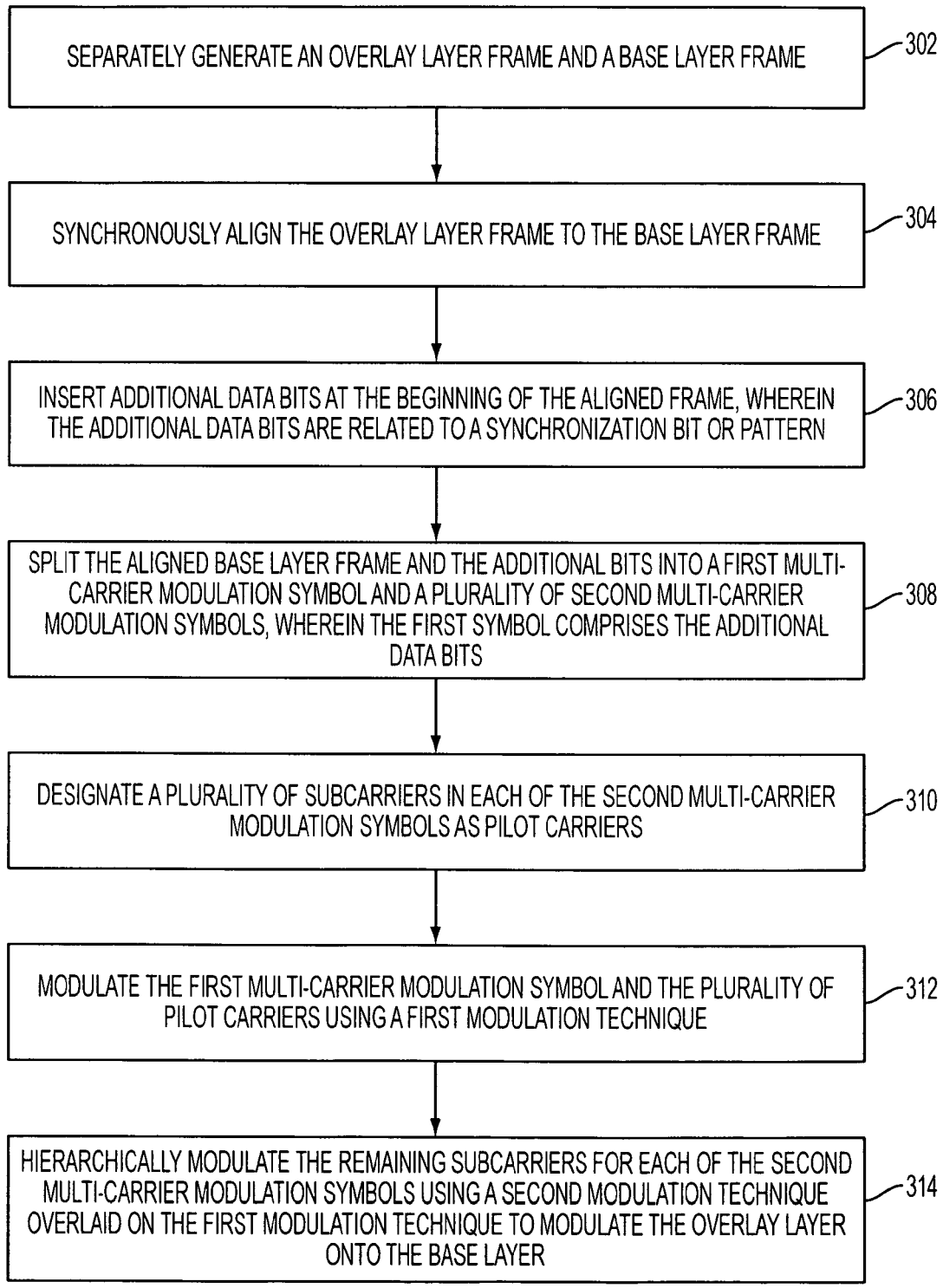
FIG. 11 is a flowchart illustrating a second method for hierarchically modulating a transmission frame including an overlay layer modulated onto a base layer according to an illustrative embodiment of the present invention.
Figure 12:
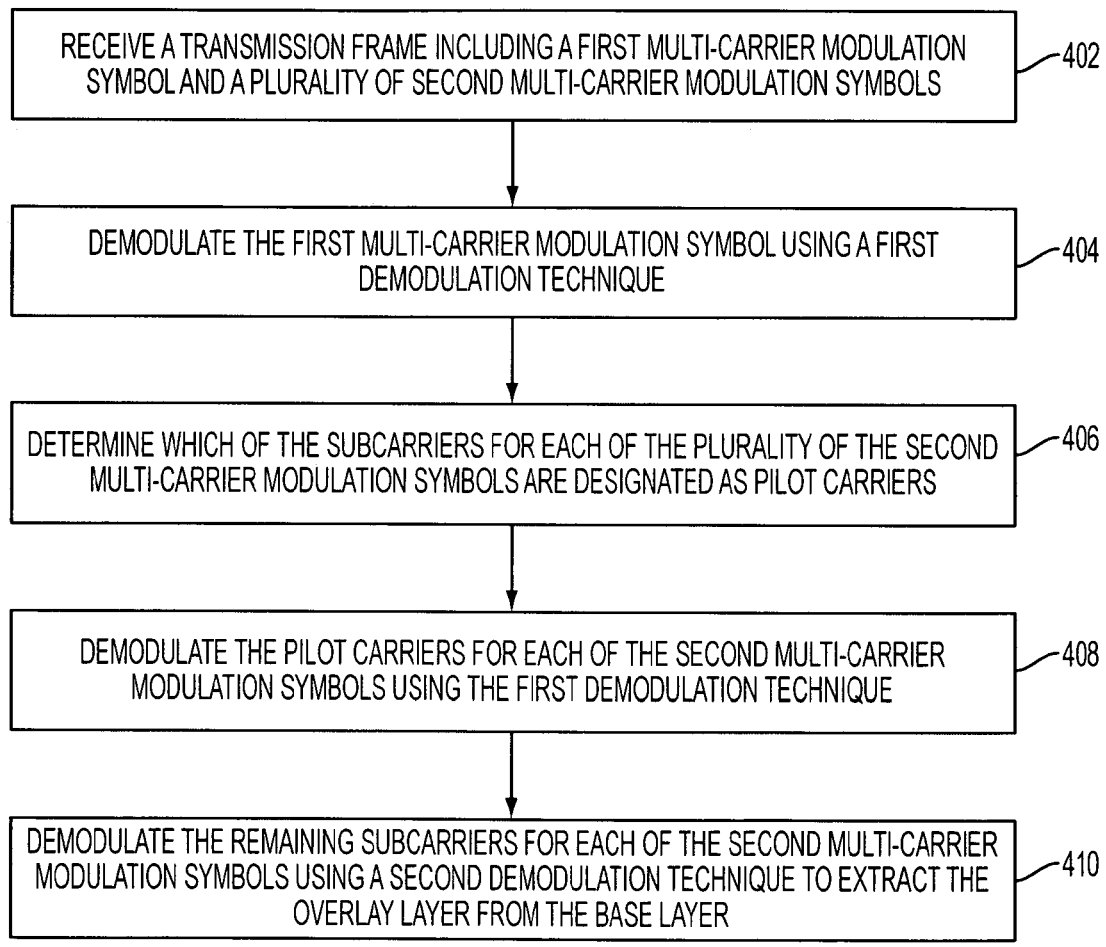
FIG. 12 is a flowchart illustrating a second method for demodulating a hierarchically modulated transmission frame including an overlay layer modulated onto a base layer according to an illustrative embodiment of the present invention.

FIG. 8. depicts a block diagram of a receiver or subscriber unit 3 in accordance with an illustrative embodiment of the present invention. As discussed above, receiver 3 operationally receives two satellite (SAT1 and SAT2) and terrestrial signals, and demodulates and separates the base layer and overlay layer data streams. For both the base layer and overlay layer data streams, the two satellite and terrestrial streams can be combined (maximal ratio combining) before and/or after FEC decoding to minimize errors. In an illustrative embodiment, the combining can be performed using maximal ratio combining (before the FEC decoder) or selective combining (after the FEC decoder).

As shown in FIG. 8, the receiver 3 includes a down converter 81 for down converting the received hierarchically modulated signals of an illustrative embodiment. In existing XM Satellite Radio technology, a legacy or non-hierarchically modulated receiver system 80 typically includes a first satellite signal (SAT1) demodulator 82, a second satellite signal (SAT2) demodulator 84, and a terrestrial signal demodulator 86, for demodulating the modulated base layer. The modulated signals are further processed by a transport layer processor 88 before optionally combining the satellite signals using a maximal ratio combiner 70 and/or combining the satellite signals with the terrestrial signal using another combiner (selective combiner) 76. The receiver unit 3 further includes a FEC decoder 72 after the combiner 70 for forward error correcting the received satellite signals and a FEC decoder 74 for forward error correcting the terrestrial signal before combining with the satellite signals at the combiner 76. The resultant base layer audio/data stream is then further processed at the service layer to output the received services to a user.

In accordance with an illustrative embodiment of the present invention, the receiver unit 3 further includes a hierarchical or overlay layer processor 90 enabled to process the received signals in parallel (see dashed lines) or substantially in parallel with the processing of the base layer (legacy) audio/data stream. The overlay layer processor 90 hierarchically demodulates the received signals either before or after demodulation by the base layer demodulators 82, 84, and 86 using hierarchical demodulators 92 and 94 for the satellite signals (SAT1 and SAT2) and hierarchical demodulator 96 for the terrestrial signal. The hierarchically demodulated signals from demodulators 92, 94, 96 are further processed by a transport overlay layer processor 98 before optionally combining the satellite signals using a maximal ratio combiner 71 and/or combining the satellite signals with the terrestrial signal using another combiner (selective combiner) 77. The overlay processor preferably includes a FEC decoder 73 after the combiner 71 for forward error correcting the satellite signals and a FEC decoder 75 for forward error correcting the terrestrial signal before combining with the satellite signals at the combiner 77. The FEC decoders 73 and 75 are configured to decode the received streams according to the plurality of pipe configurations for the respective pipes in each stream, as discussed above. The base layer audio/data stream is then further processed at the service layer to output the additional overlay services to the user.

In an illustrative embodiment in accordance with the present invention, once the base layer audio/data stream and the overlay layer audio/data streams are processed, they can be provided to separate output sources if desired. For example, in an illustrative SDARS system, the base layer audio/data stream can be recorded or output in a radio unit, while the additional overlay audio/data stream can be provided to a display for viewing video data.

While the present invention has been shown and described with reference to particular illustrative embodiments, it is not to be restricted by the illustrative embodiments but only by the appended claims and their equivalents. It is to be appreciated that those skilled in the art can change or modify the illustrative embodiments without departing from the scope and spirit of the present invention.

The invention claimed is:

1. A method of hierarchically modulating a transmission frame including an overlay layer modulated onto a base layer, the base layer providing basic service and the overlay layer providing additional services, the method comprising:
   synchronously aligning an overlay layer frame to a base layer frame;
   generating a master frame of the base layer comprising the aligned frame by inserting additional data bits at the beginning of the aligned frame and at a selected interval throughout the aligned frame, wherein the aligned frame comprises payload bits for the base layer service and the overlay layer service, and the additional data bits are synchronization bits related to a synchronization bit or pattern of the base layer;
   modulating the synchronization bits of the master frame using a first modulation technique; and
   hierarchically modulating the payload bits of the master frame using a second modulation technique based on the first modulation technique.

2. The method of claim 1, wherein the additional bits are not aligned with any of the payload bits such that the additional bits are modulated using only the first modulation technique.

3. The method of claim 1, wherein the first modulation technique results in a base layer signal of higher signal power than the overlay layer signal modulated using the second modulation technique.

4. The method of claim 1, wherein the first modulation technique uses quadrature phase shift keying (QPSK).

5. The method of claim 4, wherein the second modulation technique is a hierarchical phase shift keying technique applying a phase offset representing a bit of the overlay layer onto a QPSK symbol of the base layer.

6. The method of claim 1, wherein the first modulation technique is a hierarchical quadrature phase shift keying (QPSK) technique with a first phase offset applied a standard QPSK symbol.

7. The method of claim 6, wherein the second modulation technique is a hierarchical QPSK technique with a second phase offset applied to a standard QPSK symbol, wherein the second phase offset is larger than said first phase offset.

8. The method of claim 1, wherein the transmission frame is transmitted, and further comprising:
   receiving the transmission frame including first data symbols modulated using the first modulation technique combined with second data symbols modulated using the second modulation technique;
   demodulating the first data symbols of the received transmission frame using a first demodulation technique corresponding to the first modulation technique, the demodulated first data symbols comprising bits related to the synchronization bits;
   synchronizing the received frame according to the demodulated first data symbols, the overlay layer frame being aligned with the base layer frame; and
   demodulating the received second data symbols of the received transmission frame using a second hierarchical demodulation technique corresponding to the second modulation technique to obtain the overlay layer payload.

9. The method of claim 8, wherein the first data symbols are interspersed through the received transmission frame and comprise the synchronization bits for the received transmission frame, and the second data symbols comprise payload data symbols for the base layer and the overlay layer, wherein the first data symbols are modulated using only the first modulation technique.

10. The method of claim 8, further comprising
   receiving a signal comprising the transmission frame from each of at least two receiver arms selected from the group consisting of a first satellite receiver arm, a second satellite arm, and a terrestrial repeater arm;
   demodulating the transmission frame by each of the at least two receiver arms to obtain the first data symbols and the second data symbols;
   synchronizing the transmission frame at each of the at least two receiver arms using the first data symbols; and
   combining the second data symbols corresponding to the overlay services from the at least two receiver arms.

11. The method of claim 10, wherein combining comprises combining the second data symbols corresponding to the overlay services from the first satellite receiver arm and the second satellite receiver arm using a maximal ratio combiner.

12. The method of claim 10, wherein combining comprises selectively combining the second data symbols corresponding to the overlay services from the terrestrial repeater arm with the second data symbols corresponding to the overlay services from at least one of the first satellite receiver arm and the second satellite receiver arm.

13. A computer readable medium having instructions stored thereon for modulating a transmission frame including an overlay layer modulated onto a base layer, the base layer providing basic service and the overlay layer providing additional services, the instructions performing the steps of:

synchronously aligning an overlay layer frame to a base layer frame;

generating a master frame of the base layer comprising the aligned frame by inserting additional data bits at the beginning of the aligned frame and at a selected interval throughout the aligned frame, wherein the aligned frame comprises payload bits for the base layer service and the overlay layer service, and the additional data bits are synchronization bits related to a synchronization bit or pattern of the base layer;

modulating the synchronization bits of the master frame using a first modulation technique; and hierarchically modulating the payload bits of the master frame using a second modulation technique based on the first modulation technique.

14. The computer readable medium of claim 13, wherein the first modulation technique results in a base layer signal of higher signal power than the overlay layer signal modulated using the second modulation technique.

15. The computer readable medium of claim 13, wherein the first modulation technique uses quadrature phase shift keying (QPSK).

16. The method of claim 15, wherein the second modulation technique is a hierarchical phase shift keying technique applying a phase offset representing a bit of the overlay layer onto a QPSK symbol of the base layer.

17. The computer readable medium of claim 13, wherein the first modulation technique is a hierarchical quadrature phase shift keying (QPSK) technique with a first phase offset applied a standard QPSK symbol.

18. The method of claim 17, wherein the second modulation technique is a hierarchical QPSK technique with a second phase offset applied to a QPSK symbol, wherein the second phase offset is larger than said first phase offset.

19. The computer readable medium of claim 13, wherein the additional bits are not aligned with any of the payload bits such that the additional bits are modulated using only the first modulation technique.

* * * * *